(12) United States Patent
Gera

(10) Patent No.: US 10,997,248 B2
(45) Date of Patent: May 4, 2021

(54) DATA ASSOCIATION USING COMPLETE LISTS

(71) Applicant: IGMR Research Ltd., Petah Tikva (IL)

(72) Inventor: Idan Gera, Modiin-Maccabim-Reut (IL)

(73) Assignee: IGMR RESEARCH LTD., Petah Tikva (IL)

( * ) Notice: Subject to any disclaimer, the term of this patent is extended or adjusted under 35 U.S.C. 154(b) by 178 days.

(21) Appl. No.: 16/234,913

(22) Filed: Dec. 28, 2018

(65) Prior Publication Data

US 2020/0210480 A1 Jul. 2, 2020

(51) Int. Cl.
*G06F 16/20* (2019.01)
*G06F 16/901* (2019.01)
*G06F 16/28* (2019.01)

(52) U.S. Cl.
CPC ........ *G06F 16/9024* (2019.01); *G06F 16/285* (2019.01)

(58) Field of Classification Search
CPC .......................... G06F 16/9024; G06F 16/285
See application file for complete search history.

(56) References Cited

U.S. PATENT DOCUMENTS

| | | | | |
|---|---|---|---|---|
| 2008/0319983 A1* | 12/2008 | Meadows | ............. | G06F 16/273 |
| 2010/0161634 A1* | 6/2010 | Caceres | ................ | G06F 16/217 |
| | | | | 707/758 |
| 2013/0054598 A1* | 2/2013 | Caceres | ................ | G06F 16/215 |
| | | | | 707/737 |
| 2015/0205842 A1* | 7/2015 | Jain | ........................ | G06F 16/215 |
| | | | | 707/732 |

* cited by examiner

*Primary Examiner* — Khanh B Pham
(74) *Attorney, Agent, or Firm* — Myers Wolin, LLC

(57) ABSTRACT

A method, a system and a product for performing a processing operation with respect to a first data object. The method comprises obtaining a second data object, which comprises a second set of attributes and values thereof different than the first set of attributes and values thereof of the first data object; identifying, in the first and second sets of attributes, a shared attribute, each of which having a corresponding shared value; obtaining a complete list with respect to the shared attribute; and in response to determining that a number of entries in the complete list that comprise the corresponding shared value for each of the at least one shared attribute is exactly one, processing the second data object as part of the processing operation of the first data object; and avoiding processing in the processing operation additional object; whereby reducing an overall processing time and an overall storage required for performing the processing operation.

20 Claims, 16 Drawing Sheets

| Type | Contributor type | Name | City | State | Employer | Committee | Date | Amount |
|---|---|---|---|---|---|---|---|---|
| Contribution | Person | Cross, Robert | Fort Myers | FL (USA) | Apple inc. | Special operations for america | 11/04/2005 | 500.00 |

| Type | Name | City | State |
|---|---|---|---|
| Person | Robert Cross | Fort Worth | TX (USA) |
| Person | Kyko Micalakuan | Fort Worth | TX (USA) |
| Person | John Smith | Fort Worth | TX (USA) |
| ... | ... | ... | ... |

540a → (row 1)
540b → (row 2)
540c → (row 3)

| Type | Name | City | State |
|---|---|---|---|
| Person | Robert Cross | Fort Worth | TX (USA) |

540a → (row 1)

FIG. 5E

| Type | Name | City | State | Employer | Education | Wife | Wife DoB |
|---|---|---|---|---|---|---|---|
| Person | Robert Cross | Fort Worth | TX (USA) | Apple inc. | BA Mechanical Engineering, MIT | Sylvia Cross | April 2, 1974 |

| Child Name | Child Date of Birth | Parent Name | Parent Date of Birth | State |
|---|---|---|---|---|
| Dylan Cross | July 1, 2008 | Sylvia Cross | April 2, 1974 | TX |
| John Smith | August 15, 2008 | Donald Smith | February 11, 1970 | TX |
| Kyle Cross | January 21, 2008 | Avery Cross | August 10, 1990 | TX |
| ... | ... | ... | ... | ... |

570a → (Dylan Cross row)

| Name | State | Year of Birth | Address |
|---|---|---|---|
| Sylvia Cross | TX | 1974 | 2209 Plum Ln Apt 323, Arlington |
| Sylvia Cross | TX | 1954 | 21 Casa de Amigos, Brownsville |
| Sylvia J Cross | TX | 1942 | 201 Oak Crest Hill Dr, Colleyville |
| Sylvia L Cross | TX | 1959 | Rr 1 Box 484, Ingleside |
| Sylvia M Cross | TX | 1954 | 14539 Broken Arrow Rd, Santa Fe |
| Sylvia S Cross | TX | 1972 | 469 Sunset, Ingleside |

580a → (Sylvia Cross, 1974 row)

FIG. 5K

| Type | Entity Type | Name | City | Phone |
|---|---|---|---|---|
| Contact of the company | Person | John Smith | New York Amsterdam | 07594924884 |
| Contact of the company | Company | Samsung | Shanghai Tel Aviv New York | 04797773829 |
| Contact of the company | Person | Yau Ming | Boston Los Angeles | |
| Contact of the company | Person | Sam Jackson | New York | 08363902773 |

FIG. 5L

| Type | Entity Type | Name | City | Phone |
|---|---|---|---|---|
| Contact of the company | Person | John Smith | New York | 07594924884 |
| Contact of the company | Person | Sam Jackson | New York | 08363902773 |

FIG. 5M

DATA ASSOCIATION USING COMPLETE LISTS

TECHNICAL FIELD

The present disclosure relates to data processing in general, and to matching different data objects referring to a same entity, in particular.

BACKGROUND

Nowadays, "big data" is everywhere. From medical research and eHealth using Internet of Things (IoT) devices that continuously aggregate data to the finance sector and stocks prices predictions, using deep learning algorithms (e.g., Recurrent Neural Network (RNN)). The data is being obtained from numerous sources and pre-processing efforts in data preparation, before the data can be used, may be substantial. During pre-processing, the data may be validated. Additionally or alternatively, the data may be filtered to remove superfluous items and erroneous items. In some cases, some attributes may be known to have low correlation with desired attributes and may be filtered out accordingly. Big data techniques, such as utilizing deep learning algorithms, may be applied on the data remaining after the pre-processing is performed, to extract insights.

Resources utilized in analyzing "big data" may be substantive. From computational resources in processing large volumes of data, through storage resources in retaining the data, and to network resources in transmitting the data from one device to another.

Another challenge lies within the domain of storing the data. As the data size is substantive, such as terabytes, petabytes, or more, storing the data is very expensive and fetching relevant data may also be very expensive and time consuming as the data may be saved on remote cloud.

BRIEF SUMMARY

One exemplary embodiment of the disclosed subject matter is a method for performing a processing operation with respect to a first data object, the first data object comprises a first set of attributes and values thereof, the method comprising: obtaining a second data object, wherein the second data object comprises a second set of attributes and values thereof, wherein the first set of attributes is different than the second set of attributes; identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute; obtaining a complete list with respect to the at least one shared attribute, wherein the complete list comprises all data objects of a shared type, wherein each of the all data objects of the shared type comprise a value for each of the at least one shared attribute; and in response to determining that a number of entries in the complete list that comprise the corresponding shared value for each of the at least one shared attribute is exactly one, processing the second data object as part of the processing operation of the first data object; avoiding processing in the processing operation a third data object having one or more attributes and values that are shared with the first data object; whereby reducing an overall processing time and an overall storage required for performing the processing operation.

Optionally, the method comprises obtaining the first data object, wherein said obtaining the first data object comprises: obtaining an initial data object, wherein the initial data object excludes at least a portion of the at least one shared attribute; and extending the initial object to include the at least the portion of the at least one shared attribute based on a fourth data object.

Optionally, said extending the initial object comprises: determining a subset of the first set of attributes yielding a second complete list of size one, wherein the second complete list comprises the subset of the first set of attributes and values thereof; and obtaining the fourth data object, wherein the fourth data object comprises the subset of the first set of attributes and values thereof and the at least the portion of the at least one shared attribute.

Optionally, the at least the portion of the at least one shared attribute comprises a first attribute and a second attribute, wherein said extending comprises adding to the initial object the first attribute based on the fourth data object and adding to the initial object the second attribute based on a fifth object.

Optionally, said obtaining the complete list comprises: obtaining a first complete list and a second complete list, wherein the first complete list and the second complete list comprise data objects of the shared type, wherein the first complete list is a complete list with respect to the at least one shared attribute and an auxiliary attribute being assigned a first value, wherein the second complete list is a complete list with respect to the at least one shared attribute and the auxiliary attribute being assigned a second value; and merging the first complete list and the second complete list to obtain the complete list.

Optionally, the at least one shared attribute comprises a first shared attribute and a second shared attribute, wherein said obtaining the complete list comprises: obtaining an initial complete list with respect to the first shared attribute, wherein the initial complete list comprises data objects of the shared type, wherein each entry in the initial complete list has a value corresponding the second shared attribute; and deriving the complete list from the initial complete list by selecting a subset of the entries for which the second shared attribute comprises the corresponding shared value thereof.

Optionally, said obtaining the complete list comprises: obtaining a first list and a second list, wherein each of the first and second lists comprise data objects of the shared type having a value for each of the at least one shared attribute; and in response to determining that there are no other lists that comprise data objects of the shared type, combining the first list and the second list to form the complete list.

Another exemplary embodiment of the disclosed subject matter is a computerized apparatus having a processor and coupled memory, the processor being adapted to perform a method for performing a processing operation with respect to a first data object, the first data object comprises a first set of attributes and values thereof, the method comprising: obtaining a second data object, wherein the second data object comprises a second set of attributes and values thereof, wherein the first set of attributes is different than the second set of attributes; identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute; obtaining a complete list with respect to the at least one shared attribute, wherein the complete list comprises all data objects of a shared type, wherein each of the all data objects of the shared type comprise a value for each of the at least one shared attribute; and in response to determining that a number of entries in the complete list that comprise the corresponding shared value for each of the at least one shared attribute is exactly one, processing the second data object as part of the processing operation of the first data object; avoiding processing in the processing operation a third data object having one or more attributes and values that are shared with the first data object; whereby reducing an overall processing time and an overall storage required for performing the processing operation.

Yet another exemplary embodiment of the disclosed subject matter is a computer program product comprising a non-transitory computer readable medium retaining program instructions, which program instructions when read by a processor, cause the processor to perform a method comprising: having a first data object, wherein the first data object comprises a first set of attributes and values thereof; obtaining a second data object, wherein the second data object comprises a second set of attributes and values thereof, wherein the first set of attributes is different than the second set of attributes; identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute; obtaining a complete list with respect to the at least one shared attribute, wherein the complete list comprises all data objects of a shared type, wherein each of the all data objects of the shared type comprise a value for each of the at least one shared attribute; in response to determining that a number of entries in the complete list that comprise the corresponding shared value for each of the at least one shared attribute is exactly one, processing the second data object as part of a processing operation of the first data object; and avoiding processing in the processing operation a third data object having one or more attributes and values that are shared with the first data object; whereby reducing an overall processing time and an overall storage required for performing the processing operation.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 5A-5M illustrate various data objects and complete list, in accordance with some exemplary embodiments of the disclosed subject matter.

DETAILED DESCRIPTION

Figure 1:
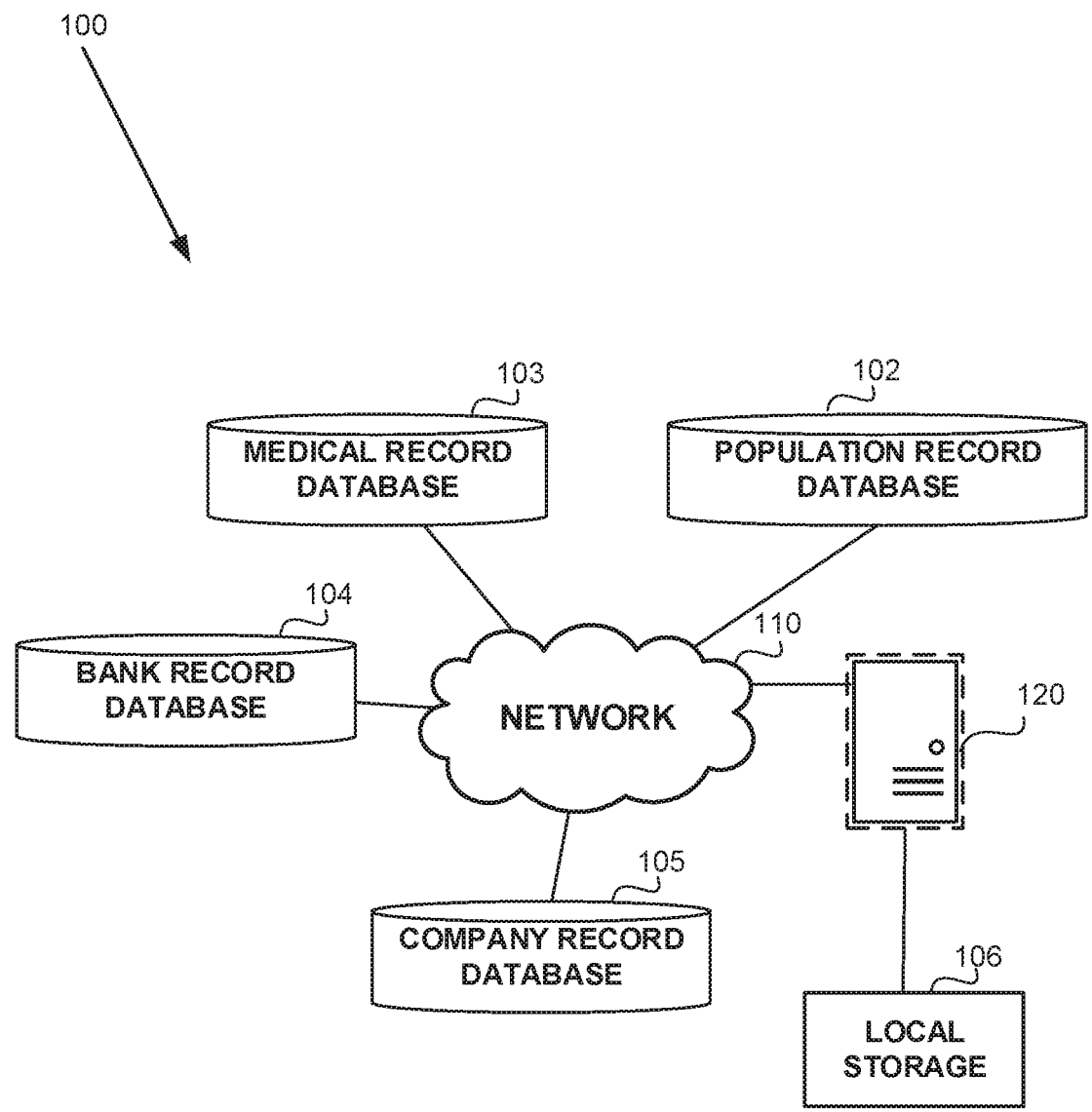
FIG. 1 shows a computerized environment, in accordance with some exemplary embodiments of the disclosed subject matter.

In the disclosed subject matter, two objects are said to be "assuredly matched" when the two objects refer to a same entity. As an example, the two objects may be representing a computer (e.g., one obtained from a list of a person's belongings and the other obtained from a list of computers sold by a website). The two objects may be said to be "assuredly matched" if they are the same computer. As another example, a list of properties may indicate, for each property, an owner of the property. A data object extracted from that list may be assuredly matched with a data object representing one employee of a company, if the two refer to the same person. It is noted that non-assured matching may be performed when two objects are potentially referring to a same entity, however, there is the possibility that they may refer to different entities. As an example, a matching that is performed with 99% confidence still has a 1% possibility that the two data objects are not referring the same entity, and as such, such matching is not an assured matching.

One technical problem dealt with by the disclosed subject matter is to process data regarding an entity. The data may be obtained from multiple sources, such as but not limited to several data repositories accessible through the Internet. However, it may be desired to process only relevant data. In some exemplary embodiments, it may be desired to assuredly match two data objects. In some exemplary embodiments, it may be desired to determine whether two entries in two different tables, are referring to the same object or not. In some exemplary embodiments, it may be desired to assuredly match a data object with one or more objects appearing in a list of data objects.

As an example, a data object may be a group of 2-tuples where each 2-tuple comprises an attribute and a value. In some exemplary embodiments, one attribute may be "Name" and the corresponding value may be "Robert Cross". Given two different data objects, both comprising the same value for the attribute ("Name"="Robert Cross"), the disclosed subject matter may be used to determine that "Robert Cross" of the first data object is the same "Robert Cross" of the second data object. As another example, a first data objects may comprise two 2-tuples. The first (attribute, value) 2-tuple may be (Name, Robert Cross) and the second (attribute, value) 2-tuple may be (City, Fort Worth). A second data object may comprise the following 2-tuples (Name, Anna), (Husband Name, Robert Cross), (City, Fort Worth), (State, Texas), (Employee, Google Inc.). The disclosed subject matter may be applied on the first data object and on the second data object in order to decide that the Robert Cross represented by the first data object is the husband of Anna that the second data object refers to, or not. In some cases, there may be several people named Robert Cross and the name alone may be insufficient to assuredly match the two data objects. In other cases, the two data objects may be assuredly matched, using the technical solution of the disclosed subject matter.

It is noted, however, that a data object may be represented using any desired manner of data representation and is not limited to the example of representation using tuples. The data object may be represented by a record, a class, a set of lists, or the like.

In some exemplary embodiments, the two data objects may not share common attributes and values. Still, it may be desired to determine whether they refer to the same entity.

As an example, consider a data object representing one adult. It may be desired to assuredly match the adult with a data object representing his child. The first and second data objects may not share a common value, as the data object representing the adult may not indicate his children's identity, and the data object representing the child may not indicate the identity of the parent.

It is noted that the same data object may be assuredly matched with several different objects. Referring again to the example above, the object representing the adult may be assuredly matched with several objects, each of which representing a different child. As another example, the object representing the child may be assuredly matched with two objects—one representing the father and the other representing the mother. The object representing the child may also be assuredly matched to an object representing the child's pet. As can be appreciated, each assured matching is based on the two matched objects referring to the same underlying entity. However, each object may refer to several underlying entities.

Another technical problem dealt with by the disclosed subject matter may be to augment a data object to include additional data. In some exemplary embodiments, it may be desired to add additional attributes to an existing data object, thereby adding more information regarding the object.

One technical solution provided by the disclosed subject matter may be to utilize a complete list in order to perform assured matching of data objects. A complete list may be a list of entries sharing a property, and which includes all entries having the property. A list may be a complete list with respect to one property (e.g, attribute=value) and not with respect to another property. In some exemplary embodiments, the property may be a set of one or more attributes having a corresponding set of values, and for each entry in the list, the set of attributes is assigned with the corresponding set of values. As an example, a list may be a complete list of all employees of a certain company, if it includes all such employees. If one employee is missing from the list, the list is not a complete list. As another example, a list of children that reside in New York may be a complete list if it includes all the children that reside in New York and is not missing any such child.

In some exemplary embodiments, the disclosed subject matter may identify at least one shared attribute having a shared value in both the first and second data objects. A complete list with respect to the shared attribute may be obtained and a number of entries therein may be counted. In case the complete list includes exactly one entry, the two data objects may be assuredly matched.

In some exemplary embodiments, there may be two shared attributes having shared values. In some exemplary embodiments, an initial complete list with respect to the first shared attribute may be obtained. However, such complete list may not yield a single entry for the shared value. The complete list may be derived from the initial complete list by selecting a sub-list thereof for which the second shared attribute is assigned the corresponding shared value. In some exemplary embodiments, deriving the complete list from the initial list based on the second attribute may be performed only if the second attribute is a complete attribute in the initial complete list. An attribute may be referred to as a complete attribute in a list, if for each entry in that list, the attribute is assigned with a value. Put differently, if there is one entry for which the attribute is not assigned a value, the attribute is not a complete attribute in the list. In some exemplary embodiments, prior to deriving the complete list based on the second attribute, it may be verified that the second attribute is a complete attribute in the initial complete list, such as by determining that each entry in the initial complete list has a value corresponding to the second shared attribute. In some exemplary embodiments, such said deriving may be accomplished by filtering the initial complete list using a wildcard search for entries that will match the corresponding value of the second shared attribute.

As an example, the first data object may refer to a person and may comprise attributes and values such as but not limited to name, street, city, name of pet, birthdate, or the like. The second data object may be obtained from a list of pets that were involved in an incident. Each entry in the list may comprise attributes such as the name of the pet, street, city, a type of incident, and outcome of the incident. It may be desired to determine whether a person represented by the first data object is assuredly matched to the pet represented by the second data object, such as for example, due to the person being the owner of the pet. Consider, for example, that the name of the pet, the street name and the city are shared between the two data objects. This alone may be insufficient to assuredly match the two objects, as there may be additional pets with the same name in the same street. A municipal list of pets may be obtained and used as a complete list to enable assured matching. Each entry in the list may comprise, among other things, the name of the pet and an address, which includes a street name. A complete list of the shared attributes having shared values, i.e., a complete list of all entries for which the name of the pet is as in the data objects and the address includes the street name appearing in the data objects, may be derived. If the list includes a single entry, the two data objects can be assuredly matched. If the list includes two entries or more, assured matching cannot be performed.

It is noted that the complete list may be determined based on a portion of the shared attributes and not necessarily using all of them. For example, the complete list may not comprise all the shared attributes.

In some exemplary embodiments, once an attribute is verified as being a complete attribute in a list, it may be noted as a complete attribute. The notation may be retained for future handling to avoid additional and potential duplicative computations. An attribute may be noted as complete attribute by adding a feature such as "complete", "isCompleteAttribute:true", or the like. The notation may be added to an object representing the attribute, the list, or the like. In some exemplary embodiments, when deriving a complete list from another complete list, derivation may be based on a complete attribute. Instead of processing the list to determine whether or not the attribute is a complete attribute, the retained notation may be utilized. In some cases, a notation indicating that the attribute is not a complete attribute may also be utilized. Additionally or alternatively, a notation of a non-complete attribute may provide a link to at least one data record in which the attribute has no assigned value. Hence, verifying that the attribute is still non-complete may be performed in a constant complexity time (e.g., $O(1)$), by verifying that the linked object does not assign a value to the attribute.

In some exemplary embodiments, there may a freshness property, such as "lastCheckedCompleteness" with a corresponding date value. As an example, the freshness property may be used when the completeness notation is utilized, to determine whether the same can be used without re-computation or whether re-verification is desired. For example, a freshness of about one day may indicate the notation to still be likely correct, while a freshness of about one year may indicate that completeness notation may not necessarily be up to date. In some exemplary embodiments, the freshness threshold that is utilized may differ depending on the data type that is noted to be completed. For example, a birthdate attribute is not likely to change, as opposed to a residential address. As such, a freshness threshold of one month for the residential address may be used, a freshness threshold of one year may be used for the birthdate. An IP address, on the other hand, may require a different, shorter, freshness threshold, such as one hour.

In some exemplary embodiments, a notation of a complete list may be used for a list that was determined to be a complete list. The notation may be retained for future handling to avoid additional and potential duplicative computations. A list may be noted as complete list by adding a feature such as "complete", "isCompleteList:true", or the like, and as non-complete list by adding a feature such as "incomplete", "isCompleteList:false", or the like. The notation may be added to an object representing the list. In some exemplary embodiments, a list may be obtained and it may be determined whether or not the list is a complete list. Instead of re-assessing the completeness of the list, the complete list notation may be utilized without additional computations.

In some exemplary embodiments, there may a freshness property, such as "lastCheckedCompleteness" with a corresponding date value. As an example, the freshness property may be used when the completeness notation is utilized, to determine whether the same can be used without re-computation or whether re-verification is desired. For example, a freshness of about one day may indicate the notation to still be likely correct, while a freshness of about one year may indicate that completeness notation may not necessarily be up to date. In some exemplary embodiments, the freshness threshold that is utilized may differ depending on the data type that is noted to be completed. For example, a list of employees may change frequently, as opposed to a list of the survivors of the Titanic, which should rarely change. As such, a freshness threshold of one month for the employees list may be used, a freshness threshold of one year may be used for the list of survivors.

Another technical solution is to extend a data object using a complete list. A data object may be obtained. The data object may comprise a set of attributes. A subset of the set of attributes, for example, $Att_1$, $Att_2$, $Att_3$ that yield a unique entry may be determined. The unique entry may be the single entry of a complete list having only one entry. Based on such determination, any data object having the corresponding values in $Att_1$, $Att_2$, $Att_3$ may be assuredly matched with the data object. However, in some cases, only a subset thereof may be sufficient for assured matching. Core attributes may be a set of attributes and values thereof that are sufficient to yield a unique entry on one hand, and on the other are minimal, in the sense that removing any single attribute therefrom would not yield a unique entry. Referring to the example above, if the values of Att1 and Att2 are also sufficient to yield a unique entry, then $Att_1$, $Att_2$, $Att_3$ are not core attributes. If the values of $Att_1$ and $Att_2$ taken alone are insufficient to yield a unique entry, $Att_1$, $Att_2$ may be core attributes. Additionally or alternatively, additional core attributes may exist for the same data object, such as $Att_1$, $Att_3$, or $Att_4$, $Att_5$, $Att_6$. In some exemplary embodiments, using each set of core attributes, additional data objects that have the same values for the core attributes as the data object may be searched for. Such additional data objects may be assuredly matched to the data object. Each attribute of such additional objects may be added to the data object, thereby extending the data object.

As yet another technical solution, a first and second data objects that do not have shared attributes that are by themselves core attributes may be obtained. In order to assuredly match the two objects, the first object may be extended so as to include additional attributes, thereby adding new attributes whose value is potentially shared with the second data object. Once the extended data object and the second data object comprise shared attributes having shared values that are sufficient to perform assured matching, such matching may be performed. For example, in the beginning $Att_1$, $Att_2$, may be shared in both objects. After extending the first object, it may be additionally comprise $Att_3$, and using $Att_1$, $Att_2$, $Att_3$ (or a subset thereof that comprise $Att_3$) the two data objects may be assuredly matched.

In some exemplary embodiments, the matching is performed so as to process information relating to the data object. For example, it may be desired to determine a credit score for a person based on information available over the Internet relating thereto. In some exemplary embodiments, the data object representing the person is obtained, extended so as to allow assured matching with additional objects that are relevant for credit scores (e.g., debt records, wage records, unemployment records, property records, or the like). After the records are assuredly matched, all relevant information may be processed to provide the credit score.

Yet another technical solution provided by the disclosed subject matter relates to identifying a complete list. In some exemplary embodiments, completeness of a list may present a technical challenge. Several solutions are disclosed.

In some exemplary embodiments, a lists completeness can be measured based on the relation between the number of entries in the list to the expected number of entries in a complete list of that type. If the numbers are close, then assuming there are no duplicated entries—the list has a high chance to be complete. In some cases, deduplication may be performed to ensure lack of duplicate entries when assessing completeness based on the number of entries. For example, a number of employees of INTEL™ in Israel may be known to be 11,000, such as from IRS reports or from annual reports published to stock holders. If the list has 11,020 entries, then there is a good chance that list is complete. Similarly, the same can be said if the list comprises 11,000 entries+−10% (e.g., between about 10,000-12,000 entries).

In some exemplary embodiments, when trying to determine if a list is complete with respect to specific attributes and value assignment thereto, other lists of the same type with the same attributes may be obtained and it may be determined whether they hold entries that don't appear in the examined list. In case, the examined list comprises all the entries in the auxiliary list, there is higher chance for the list to be complete, and the list may be declared to be a complete list.

In some exemplary embodiments, completeness assessment may be based on a source of the list. In some exemplary embodiments, if the list is taken from a reliable source with a history of providing complete lists and reliable data in general, then the list has higher chances to be complete. Referring again to the example of the INTEL™ employees in Israel, if the list is obtained from a governmental agency, such as the ministry of economy and industry, then it has higher chances to be complete then if it was taken from a website forum.

In some exemplary embodiments, affiliation of the source of data to the data itself may also be a factor in assessing the probability that the list is complete. In some exemplary embodiments, if the list is taken from a source that is likely to have intimate knowledge with the data, then the list has higher chances to be complete. Referring again to the example of the INTEL™ employees in Israel, if the list is obtained from INTEL™ headquarters, then it has higher chances to be complete then if it was taken from ministry of economy and industry.

In some exemplary embodiments, the freshness of the data may be a factor in assessing the likelihood of a list being complete. The more updated the list is, the higher the likelihood that changes haven't been made since it was written and that it represents the actual state of the entries in it. The freshness of the data can be determined by examining the time the list was created or updated.

In some exemplary embodiments, the list may be obtained together with metadata that represents the description of the list. Certain keywords in the description of the list may be indicative of a list being complete. In some exemplary embodiments, if key words that represent completeness appear in the title of the list or anywhere else in the document, it can be an indication that the list is a complete list. For example, keywords such as "complete", "full", "comprehensive", "all", or the like may be indicative of a complete list. In some exemplary embodiments, the indication of completeness may be with respect to other terms in the description. For example, a list of persons that is titled as "all Israeli intel employees" is indicative that the list is a compete list with respect to "employer=intel; site=Israel", but not with respect to all employees of INTEL™. Additionally or alternatively, some keywords may indicate incompleteness of the list. For example, terms such as "partial", "some", "part", "incomplete", or the like may indicate incompleteness.

In some exemplary embodiments, any one of the indications or combinations thereof may be utilized to determine a whether the list is a complete list. In some exemplary embodiments, once a list is verified as being a complete list, a notation and freshness property may be updated. In some exemplary embodiments, prior to examining a list for completeness, the notation and freshness property may be utilized to determine whether or not to re-verify completeness of the list. In some cases, if the freshness property is below a relevant threshold, and the list is noted as complete, re-verification may be avoided, and the computation complexity may be reduced. In some exemplary embodiments, a complete list that is derived from another complete list by construction may be noted as complete by construction. In some exemplary embodiments, a list that is complete by construction may be assigned a freshness property that is based on the freshness property of the list from which it was constructed. In some exemplary embodiments, the list may be created by combining several complete lists, and the freshness property may be based on the freshness property of the several complete lists. As an example, the freshness property may be the oldest freshness property out of the freshness properties of the lists that are combined. E.g., the earliest freshness date may be viewed as the freshness date of the constructed list.

One technical effect of utilizing the disclosed subject matter is to avoid processing data which may not match the first data object. In some exemplary embodiments, the amount of data may exceed terabytes. By processing only data that is assuredly matching the first data object, the required resources, such as time and storage, may be reduced. It is noted that the reduced resources may be reduced with respect to statistical methods for aggregating data. In such methods, when in search for data regarding an item, any data that may match the item is added to the aggregated data, and thus computational and memory complexity are increased. For example, in some cases, potentially matched objects may be used to statistically provide information. For example, if there is 20% probability that a data object is matched, its relevancy may be taken with a reduced factor of about 20%. The disclosed subject matter avoids using such information and relies on assuredly matched information instead, thereby improving performance and reducing required resources.

Another technical effect of utilizing the disclosed subject matter may be to enable accurate decision making. As an example, when giving a credit score to a person, enhancing data about the person with more data may yield a credit score that is more accurate comparing to a score that was concluded based on data that is statistically matching the data about the person. The increased accuracy may be provided in a manner which computers were unable to perform prior to the disclosed subject matter, and in a manner different than how a human operates. Instead of looking for similarities between the two data objects and inferring probability of a match therefrom, the disclosed subject matter may utilize a complete list to ensure that some features are sufficient to ensure a correct match in absolute confidence. Hence, the disclosed subject matter may, in some cases, rely on fewer similarity points between the two data objects to determine the matching (e.g., using a complete list that includes only a portion of the shared attributes of the two data objects).

In some exemplary embodiments, when data is needed for decision making, statistical methods may collect as much data as possible in order to increase the confidence interval resulting in more time needed for processing the data and more storage space needed to store the data. In some exemplary embodiments, even after processing of the data is finished, the data may be retained. As an example, the data may be processed in order to approve or decline a loan request. After the decision was made, the bank may retain the data in a data storage. The data may be stored in order to enable future queries, quality assurance, or the like.

In some exemplary embodiments, a machine learning algorithm may be applied on the data. As an example, a machine learning algorithm may be applied in order to classify people according to probability of having a heart attack. The more accurate the data is less time and less data is needed for the learning algorithm. By using the disclosed subject matter, the data objects may be exact match to one another (or with higher similarity degree) and as a result, the machine learning algorithm may learn faster, require a smaller training set, be more accurate, or the like.

Yet another technical effect of utilizing the disclosed subject matter may be to aggregate data objects that are assuredly matching one another. As an example, given a person name, the disclosed subject matter may be used to find, in an assured manner, that person's wife. Given that person's wife name the disclosed subject manner be used to find the wife's parents, which are the person's parents in law; and so forth.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a computerized environment in accordance with some exemplary embodiments of the disclosed subject matter.

Environment 100 may comprise a Server 120 connected to data repositories. The data repositories may be accessible via a Network 110, such as the Internet, an intranet, Local Area Network (LAN), Wi-Fi, or the like. Additionally or alternatively, the data repositories may be retained on a Local Storage 106. The data repositories may comprise, for example, a Medical Record Database 103 retaining medical records about people. Additionally or alternatively, the data repositories may comprise a Population Record Database 102 retaining population data, such as obtained from government agencies about a country, a state, a county, a neighborhood, a zip-code area, or the like. Additionally or alternatively, the data repositories may comprise Bank Record Database 104 retaining records of financial institutions, such as banks and insurance companies. The records may indicate financial activity of different persons and transactions relating to various properties and assets. Additionally or alternatively, the data repositories may comprise a Company Record Database 105 which may be obtained from a company and indicate information regarding the company, such as its activity, its employees, contracts and agreements it has with vendors and clients, or the like. The different databases may retain information relating to the same entity and it may be desired that Server 120 be able to process information relating to the entity.

As an example, Server 120 may be configured to calculate a credit score of a person. Based on Population Record Database 102 the current residence of the person may be obtained, indicating his demographic properties. Based on Bank Record Database 104, unpaid loans and current debt of the person may be determined. Company Record Database 105 may be utilized to determine whether the person is currently employed and estimate his salary. Medical Record Database 103 may be used to determine illness and medical conditions that may hinder the person's ability to pay his debt in the future. Using records from various sources, the credit score may be computed. However, to ensure precise score computation and to avoid utilizing computational resources for information that is not related to the person (but rather someone that is similar to him), Server 120 may assuredly match the different records obtained from the different data repositories and process only those that are assuredly matched to the entity that is being examined.

Additionally or alternatively, Server 120 may be configured to extend a data record representing a company to include additional information. It may be desired to include only information that is known to be associated with the company with a 100% confidence, and not with a statistical confidence measurement. A record representing the company may initially comprise the name of the company and its registration number. Using Bank Record Database 104 financial transactions of the company may be obtained to determine a set of assets of the company and its debt. Using Company Record Database 105 the name of the CEO of the company may be obtained, and a list of all employees may be obtained. Using Population Record Database 102, the residence of the CEO may be obtained, as well as the name of her spouse. Medical Record Database 103 may be utilized to identify a medical condition of the CEO or her spouse. The information may be aggregated together to an extended data object representing the company. The extended data object may serve as a size-efficient representation of the information instead of several records retained in a distributed manner. The extended data object may be centrally retained and centrally processed. The extended data object may be used in future processing, and reduce required computational resources when the need to make a determination relating to the company arises.

Figure 2:
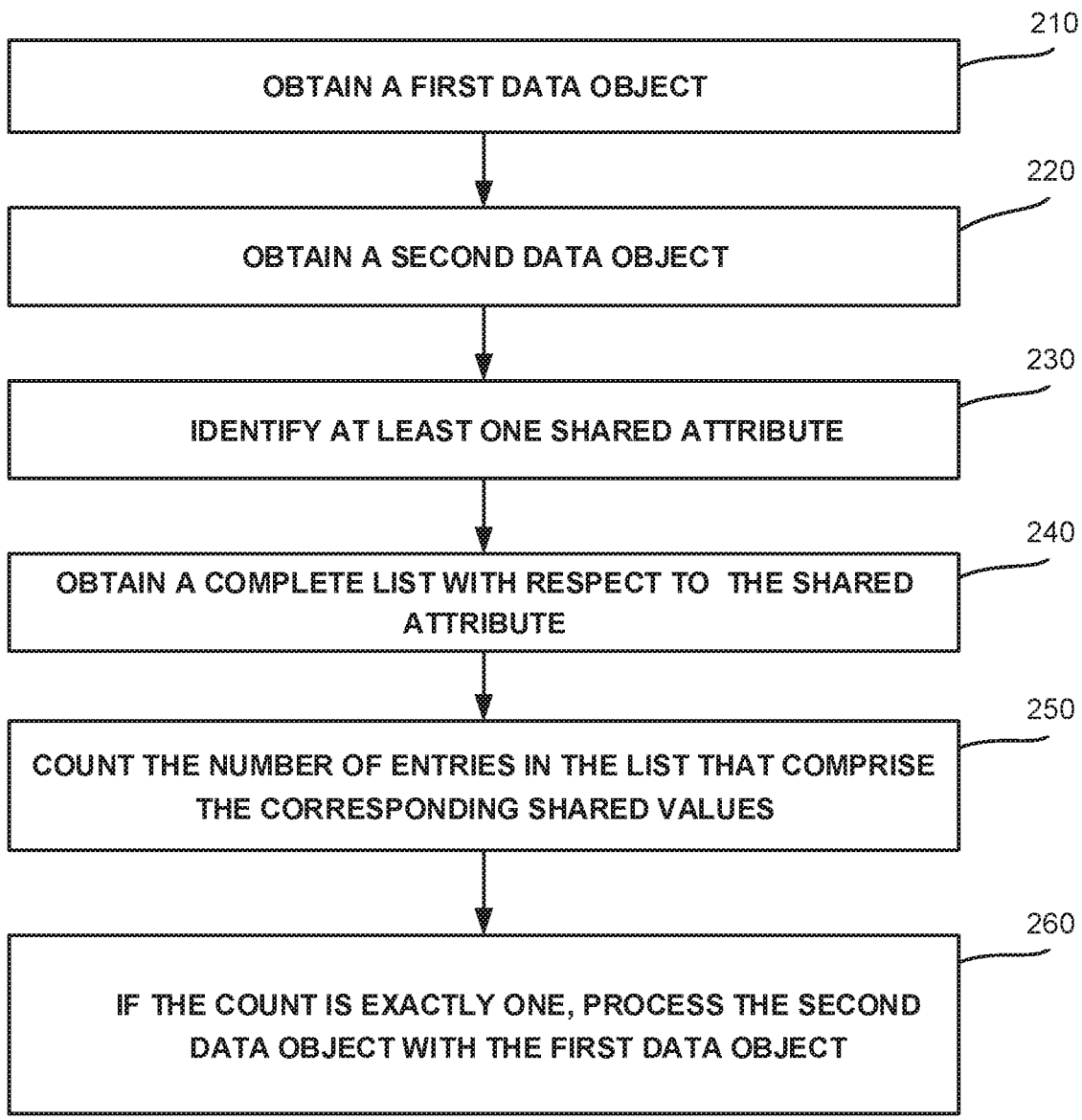
FIG. 2 shows a flowchart diagram of a method, in accordance with some exemplary embodiments of the disclosed subject matter.

Referring now to FIG. 2 showing a flowchart of a method, in accordance with some exemplary embodiments of the disclosed subject matter.

Figure 5A:
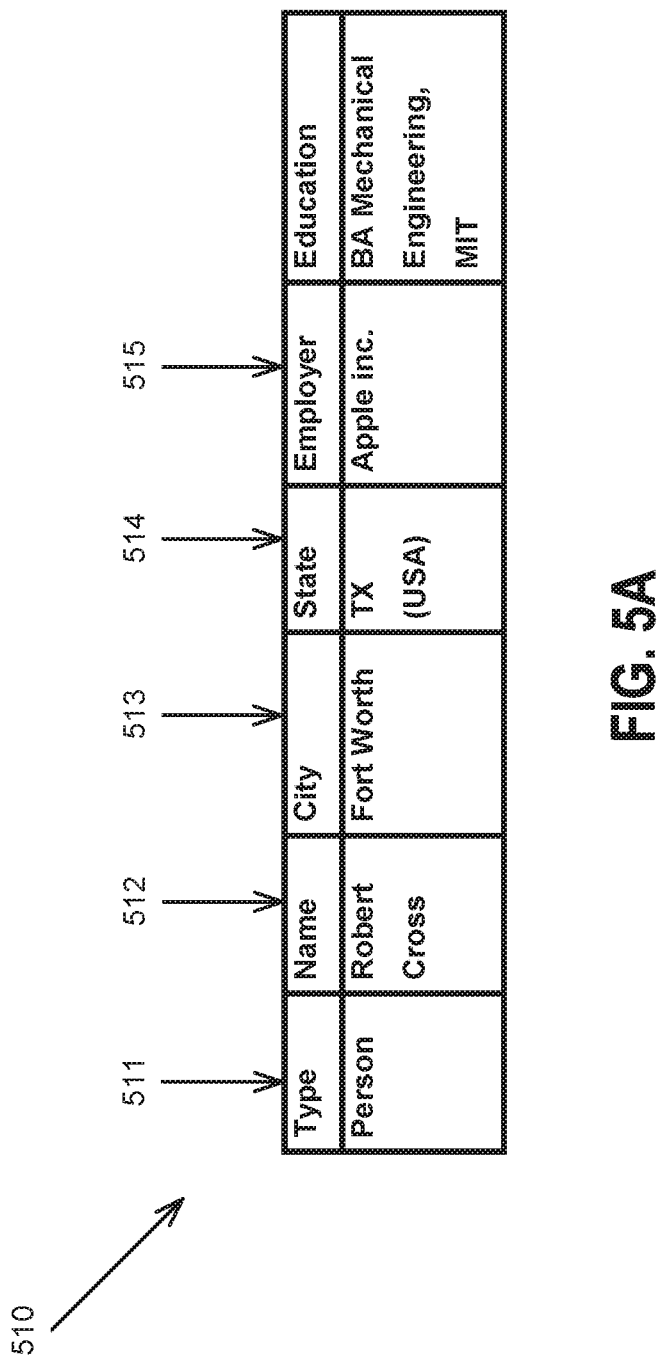

On Step 210, a first data object is obtained, such as Data Object 510 of FIG. 5A.

In some exemplary embodiments, the first data object may be obtained by accessing an online repository, accessing a local storage device, scanning a hard copy of the data, or the like. Additionally or alternatively, the first data object may obtained from records of banks, population records, medical records, companies' records, or the like. In some exemplary embodiments, the first data object may be obtained from the Internet, obtained from online services, or the like.

In some exemplary embodiments, the first data object may be used in a processing operation. The processing operation may be applied for purposes such as but limited to financial evaluations, such as credit score, debt analysis, property investigation, or the like. Additionally or alternatively, the processing may be performed as part of an advertising campaign, such as to analyze behavioral characteristics of a person, preferences thereof, or the like. Additionally or alternatively, processing may be performed to estimate political tendency, such as by locating relevant posts on social media networks, donations, signatures on petitions, or the like. Additionally or alternatively, the processing operation may be applied in big data research such as medical research, biological research, or the like.

Referring now to the example of FIG. 5A, Data Object 510 may represent a person. Specifically, Data Object 510 may indicate that it represents Robert Cross, from Fort Worth, Tex., USA. Data Object 510 may additionally indicate that the person is an employee of Apple Inc. and indicate information regarding his education.

Figure 5B:
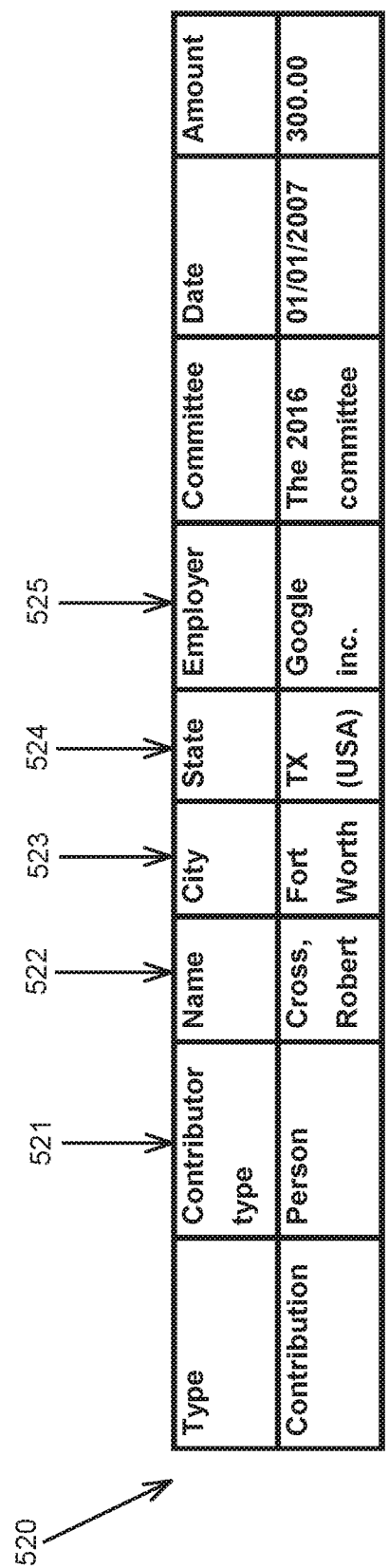

On Step 220, a second data object is obtained, such as Data Object 520 of FIG. 5B or 530 of FIG. 5C. The second data object may be obtained from similar sources as that of the first data object. In some exemplary embodiments, a list of objects may be obtained. Some or all of the objects of the list may be analyzed, and referred to, iteratively, as the second data object. In some exemplary embodiments, it may be desired to determine whether the second data object assuredly matches the first data object. In some exemplary embodiments, the second data object and the first data object may share values to attributes, and based thereon, they may be considered as a potential match to one another. As an example, in case that the first data object is related to a person, the second data object may be obtained from population records. Each record may represent a different person, and the list may be analyzed to determine which of the people in the population records match the person represented by the first data object. In some exemplary embodiments, each record may be analyzed individually. Additionally or alternatively, a filtration process may be performed, such as based on fuzzy matching the name of the person in the population record and the name appearing in the first data object. Each potential match appearing in the filtered list, may be analyzed individually until a match is found. Additionally or alternatively, several matches may be found for the same first data object.

Referring now to the example of FIG. 5B, Data Object 520 may represent a political contribution. Specifically, Data Object 520 may indicate that it represents a contribution made by a person named Robert Cross, from Fort Worth, Tex., USA. Data Object 520 may additionally indicate that the person is an employee of Google Inc., and indicate the sum of the contribution, the data and the target of the contribution (e.g., the 2016 committee).

Additionally or alternatively, the second data object may be Data Object 530 of FIG. 5C, which represents a different contribution made by a person named Robert Cross, who, at that time, was an employee of Apple Inc. Data Objects 520, 530 may be obtained from a same list of contributions and may be both analyzed with respect to Data Object 510 of FIG. 5A to determine a potential match therebetween.

On Step 230, at least one shared attribute having the same value may be identified in both the first and second data objects. A shared attribute may be an attribute that is identical between the two data objects. In some exemplary embodiments, there may be a need to correlate different attributes of the different data objects. The data objects may have been written by different people, organizations, or the like. As a result, attributes with different names may have the same meaning. As an example, a first data object may hold data regarding residents in Texas and may have an attribute "Person Name". A second data object may hold data regarding people that learned at MIT and may hold an attribute "Student Name". In some exemplary embodiments, the disclosed matter may be used in order to decide that the attribute "Person Name" and the attribute "Student Name" are shared attributes although their labels are not identical. Fuzzy matching may be used to match different labels. Additionally or alternatively, contextual analysis may be applied to infer that the student name is the name of a person represented by a record in a list of students. Additional techniques may be applied to determine two attributes having different labels still have the same meaning and are shared attributes. Given a shared attribute with an identical value, the value may be referred to as a shared value. Additionally or alternatively, similarly to shared attributes, shared values may be non-identical values, in case of different labels referring to a same meaning. For example, TX and Texas may be considered identical as they both refer to the state of Texas. As another example, "Robert Cross" and "Cross, Robert" may be considered identical. As yet another example, "Mr. Cross" and "Robert Cross" may be considered identical although the first is more general than the latter.

Based on the two data objects having the same shared attribute with the same value, the two entities represented by the data objects may be matched. However, this fact alone may not be sufficient for an assured match. For example, consider two data objects referring to the same name— Robert Cross (e.g., Data Objects 510, 520, 530). However, the name alone may not be a unique identifier as there may be more than one Robert Cross.

In some exemplary embodiments, several shared attributes may be determined. Referring again to the examples above, Data Object 510 of FIG. 5A and Data Object 520 of FIG. 5B have shared attributes with shared values such as referring to a person (Type 511 and Type 521), the name being Robert Cross (Name 512 and Name 522), the address information (City 513 and State 514 match City 523 and State 524). As another example, Data Object 510 of FIG. 5A and Data Object 530 of FIG. 5C have shared attributes with shared values such as referring to a person (Type 511 and Type 531), the name being Robert Cross (Name 512 and Name 532), and employment at Apple Inc. (Employer 515 and Employer 535).

It is noted that an increased number of shared attributes may increase the likelihood of the two data objects referring to the same entity. However, in accordance with the disclosed subject matter, it may be preferred to identify a subset of all the shared attributes, in order to assuredly match the two data objects. For example, for a set of four shared attributes there may not be an available complete list, while for a subset of three of the four shared attributes, a complete list may be available. In some exemplary embodiments, the method may be iteratively applied for the same two data objects while increasing the number of identified shared attributes until an assured match is determined. In some exemplary embodiments, the disclosed subject matter may analyze the shared attributes until determining a set of core attributes that can be used for assuredly matching the two data objects.

On Step 240, a complete list with respect to the shared attribute(s) determined in Step 230 is obtained. The complete list may comprise all entries of the shared type, assigning the shared value(s) for the shared attribute(s), the shared value. Referring again to above-mentioned example, the complete list may be a complete list of people, with respect to city="Fort Worth" and State="Texas". Put differently, the complete list may consist of all the people in Fort Worth, Tex. FIG. 5D illustrates this in Complete List 540. Complete List 540 comprises several different records such as 540a, 540b, 540c.

Complete List 540 may be a complete list with respect to City 542 and State 543. In some exemplary embodiments, Complete List 540' of FIG. 5E may be a complete list with respect to City 542, State 543 and Name 541, representing all residents of Fort Worth, Tex., USA whose names are Robert Cross.

In some exemplary embodiments, Name 541 is a complete attribute in Complete List 540, as each entry in Complete List 540 (e.g., 540a, 540b, 540c, and so on) comprises a value for Name 541. It is noted, however, that in some cases, the same entry may comprise several values for the same attribute, such as in case of aliases, different spellings of the same name, or the like. In some exemplary embodiments, Complete List 540' may be derived from Complete List 540 by applying the filter "Name=Robert Cross". Each entry in Complete List 540 which matches the filter, such as Entry 540a, may be included in the derived list, Complete List 540'. Each entry may be compared against the filter, and if one of its values for the relevant attribute (Name 541) is as defined in the filter, the entry may be considered as matching the filter.

On Step 250, the number of entries in the complete list of Step 240 may be determined. In some exemplary embodiments, the complete list may be traversed to count the number of entries therein. Additionally or alternatively, it may be determined whether the complete list consists of no entries that comprises the corresponding shared values at all, a single entry that comprises the corresponding shared values, or two or more entries that comprises the corresponding shared values. The exact number of entries that comprises the corresponding shared values may not be required. In some exemplary embodiments, if the complete list comprises more than a single entry that comprises the corresponding shared values (e.g., two entries, three entries, or the like), it may be sufficient to determine that no assured matching may be performed based thereon.

On Step 260, in response to determining that the number of entries in the complete list that comprises the corresponding shared values is exactly one, the second data object may be processed with the first data object. Steps 220-260 may be repeated so as to identify additional data objects that are assuredly matching a target data item, the first data object. As an example, the target data item may be medical data about a person. One may start by obtaining the persons' medical records, following by obtaining population records from places in which that person used to leave in on order to find data about the person's family members, following by obtaining medical records of the family members and determining that one of the family members has a hereditary disease. By using the disclosed subject matter each of the above records are assuredly matched to each other. Hence, it is possible to determine the probability that the person will have the hereditary disease.

Referring again to Complete List 540' of FIG. 5E, as Complete List 540' consists of a single entry, the shared values of the shared attributes may be determined to be sufficient for assuredly matching Data Object 510 with Data Object 520.

Figure 5F:
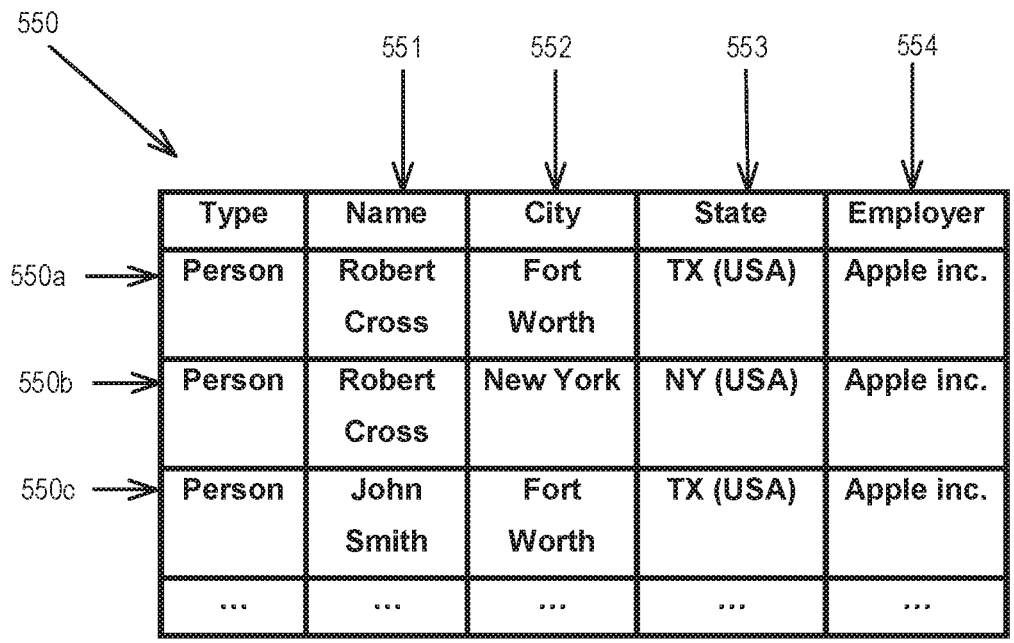
Figure 5G:
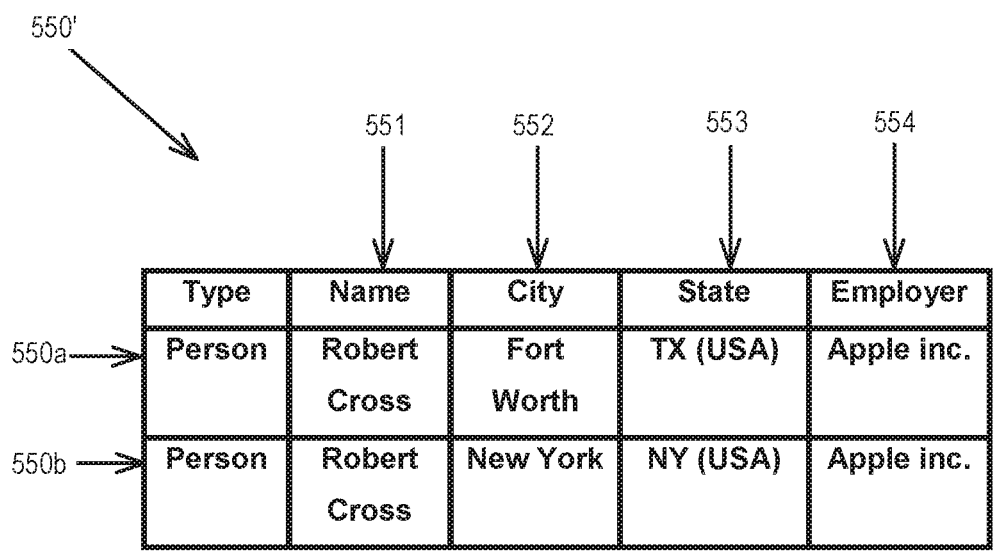
Figure 5H:
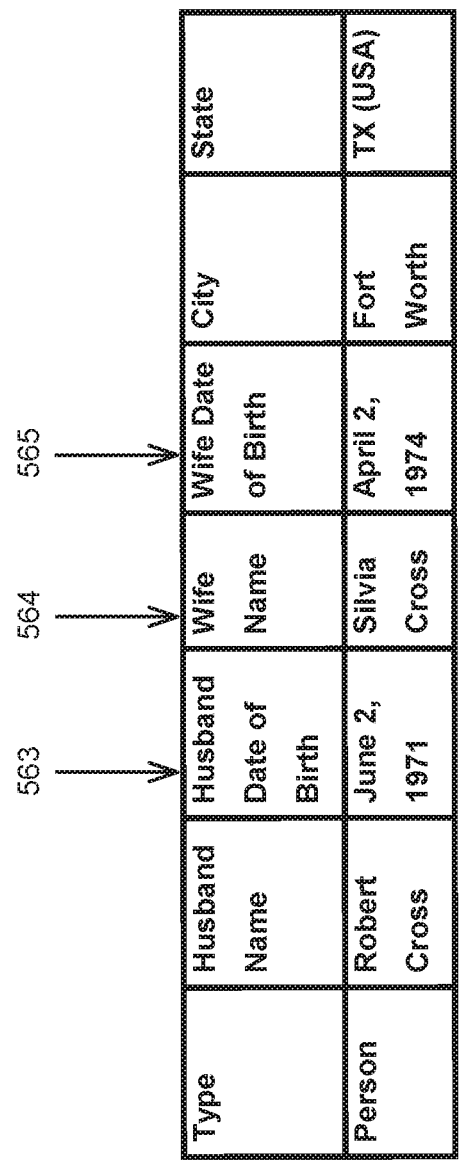
Figure 5H:
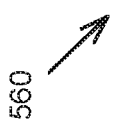

As another example, Complete List 550 of FIG. 5F comprises all employees of Apple Inc. in the USA. Complete List 550 may be obtained from Human Resources of Apple, gathered by compiling complete lists of different department of Apple over time, derived from a complete list of employees in the USA, such as may be obtainable from the Internal Revenue Service (IRS), or the like. Complete List 550 comprises Entries 550a, 550b, 550c. Based on Complete List 540, a Complete List 550' of all employees in the USA of Apple Inc. that are named "Robert Cross" may be obtained. As illustrated, Complete List 550' comprises Entries 550a, 550b as both represent an employee named Robert Cross. Based on such information, assured matching between Data Object 510 and Data Object 530 is not possible. It is noted that Entries 550a, 550b may represent the same person, who may have migrated from New York to Fort Worth. However, in the absence of information indicating that the two are identical, assured matching is not possible. It is also noted that if there was a single entry in Complete List 550', then an assured matching would have been performed in spite of the different City 552 information. Data Object 530 indicates the city of the person is Fort Myers (City 533). The two entries in Complete List 550' indicate the city as either Fort Worth or New York. Still, if Apple has only a single employee whose name is Robert Cross, assured matching can be performed. Such assured matching may also be used to determine that Robert Cross has two potential addresses—in Fort Myers and another one elsewhere.

It is noted that Complete List 550' cannot be used to assuredly match Data Object 510 and Data Object 520, as Complete List 550' is complete only with respect to employees of Apple Inc. Data Object 520 is not an employee of Apple, as Employer 525 indicates "Google Inc.". Hence, the existence of a single employee in Apple having the name Robert Cross is insufficient to assuredly match Data Object 520 with Data Object 510.

It is further noted that in Complete List 550, a unique entry can be identified for Name 551="Robert Cross", City 552="Fort Worth", State 553="TX (USA)", Employer 554="Apple Inc." (e.g., Entry 550a). However, the set of attributes Name 551, City 552, State 553 and Employer 554 is not a set of core attributes. Either State 553 or City 552 may be omitted, and a single entry would still be yielded (including solely Entry 550a). Hence, Name 551="Robert Cross", City 552="Fort Worth", Employee 554="Apple Inc." is a set of core attributes and in addition Name 551="Robert Cross", State 553="TX (USA)", Employee 554="Apple Inc." is also a set of core attributes.

Figure 3:
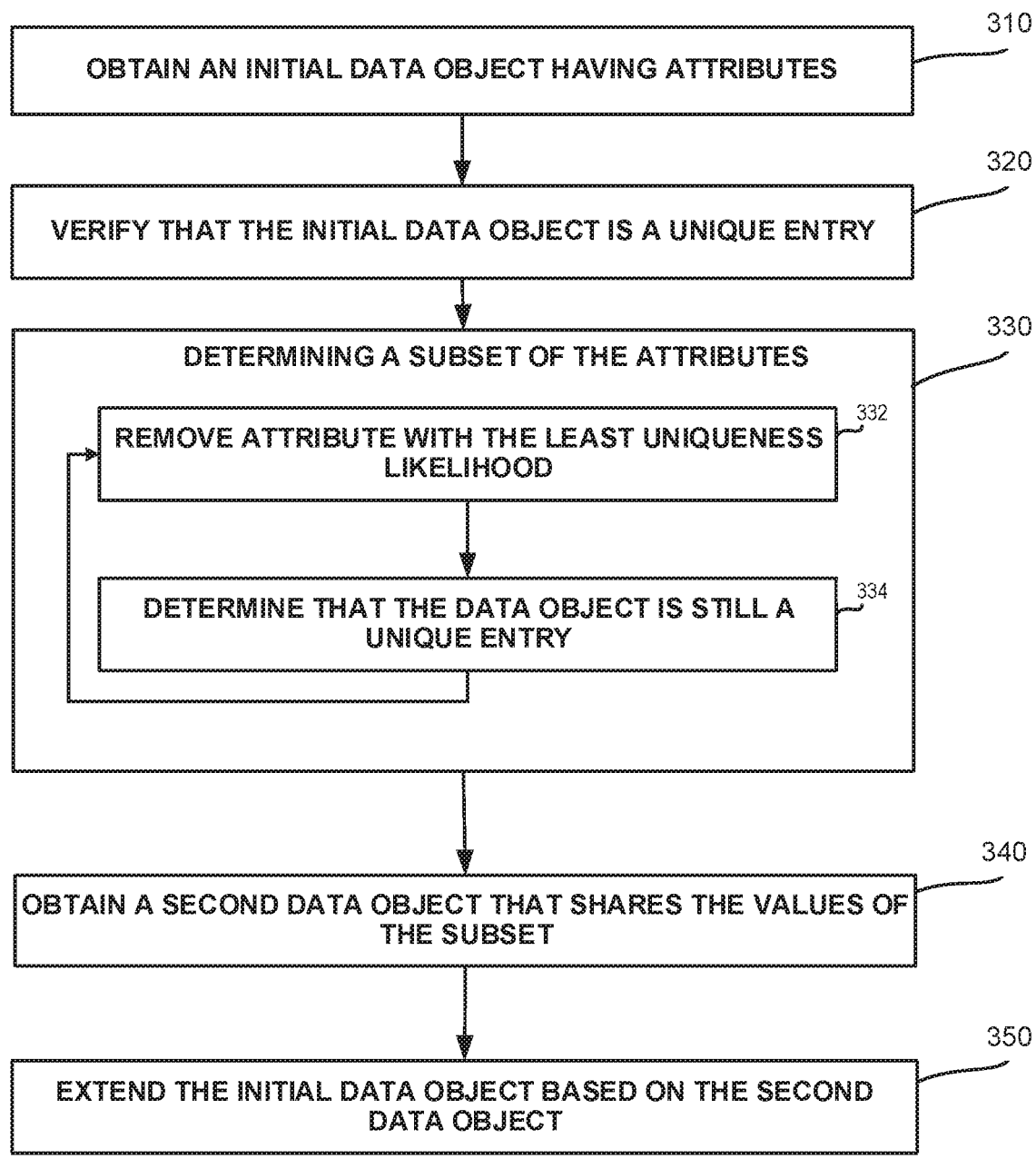
FIG. 3 shows a flowchart diagram of a method, in accordance with some exemplary embodiments of the disclosed subject matter.

Referring now to FIG. 3 showing a flowchart of a method, in accordance with some exemplary embodiments of the disclosed subject matter.

On Step 310, an initial data object is obtained, such as Data Object 510 of FIG. 5A. The initial data object may be obtained from similar sources such as the first data object in Step 210 of FIG. 2. Additionally or alternatively, the initial data object may be used in a processing operation similar to the processing operations discussed in Step 210 of FIG. 2. In some exemplary embodiments, it may be desired to extend the initial data object with additional attributes and values thereof, such as may be obtained from available data sources.

On Step 320, it may be verified that the initial object is a unique entry. A data object may be considered a unique entry if there is a complete list of a single entry that comprise the data object.

As the initial data object is a unique entry it may be assuredly matched with other objects. As an example, Data Object 510 of FIG. 5A is a unique entry in view of Complete List 540' if FIG. 5E representing only one Robert Cross from Fort Worth, Tex. Hence, any data object that has the values of the attributes that Complete List 540' is complete with respect thereto (e.g., Name 541 is "Robert Cross", City 542 is "Fort Worth" and State 543 is "TX (USA)") may be assuredly matched with Data Object 510. Put differently, any data object comprising data object 540a is an assured match to data object 510. It may be possible to find data objects that are an assured match to the initial data object and to process the initial data object alongside with the newly found data objects. However, the set of attributes and values thereof used to assuredly match the data object with other data objects may not necessarily be a core set of attributes. Additionally or alternatively, there may be alternative sets of attributes and values thereof that can be used to assuredly match Data Object 510 with other data objects, based on the complete lists available or that can be obtained in accordance with the disclosed subject matter. For example, Name 512, City 513 and State 514 may be one set, whereas Name 512, State 514 and Employer 515 may be a different set (as is exhibited by Complete List 550', which shows that there is only one employee of Apple Inc. named Robert Cross working in Texas (Entry 550a)).

On Step 330, a subset of the attributes of the initial data object may be determined. The subset may comprise the core attributes of the initial data object. In some exemplary embodiments, it may be desired to search for data objects that may be assuredly matched to the initial object. Data objects that are an assured match to the initial data object may be used to add properties to the initial data object. Additionally or alternatively, attributes and corresponding values that are in the second data object may be added to the initial data object thereby extending the initial data object. The extended data object may be used in a processing operation.

It is noted, however, that the more attributes and values that are required to match in order to assuredly match a data object to the initial data object, it is less likely that an assuredly matchable object may be identified. Hence, it may be desired to reduce the number of attributes and values thereof to a minimal number, such as to determine a core set of attributes.

In some exemplary embodiments, the subset may be determined by iteratively removing a single attribute and determining whether or not the subset can still be used to assuredly match an object to the initial data object. Different orders of attempts to reduce the number of attributes may be implemented. In some exemplary embodiments, a random order may be utilized. Additionally or alternatively, a deterministic order scheme may be utilized. In some exemplary embodiments, the order scheme may be based on an attribute uniqueness likelihood (AUL).

In some exemplary embodiments, on Step 332, the attribute with the lowest AUL may be selected for removal.

Given an attribute, the Attribute Uniqueness Likelihood (AUL) may be the probability that a value which corresponds to the attribute is in exactly one data object. For example, the AUL may be the probability that the attribute is a unique identifier of the entity represented by the data object. In some exemplary embodiments, the AUL may be calculated by dividing the number of possible values of that attribute (V) by the number of possible entries of the same type (N) as shown by the formula: AUL=V/N. It is noted that the uniqueness likelihood of an attribute may be determined per list type and can vary between different types of lists. As an example, the uniqueness likelihood of the date of birth attribute in a list of type "living people" may be roughly $365/8B \approx 4.56*10-8$. As another example the uniqueness likelihood of the date of birth attribute in a list of type living Siberian tigers may be roughly $365/500=0.73$.

In some exemplary embodiments, the AUL may be an indicator for the probability that a complete attribute can be used as part of a core set of attributes, in order to derive a unique entry. Intuitively, a higher AUL may indicate additional probability that the attribute and its value can be used as a Personally Identifiable Information (PII).

In some exemplary embodiments, after an attribute is removed from the initial set of attributes (e.g., on Step 332), on Step 334, it may be determined that the reduced set of attributes may still yield a unique entry using a complete list. In some exemplary embodiments, the complete list utilized may be the same complete list utilized in Step 320 or a different complete list. The reduction of the set of attributes may be continued until a core set of attributes is obtained. It is noted that a smaller set of attributes may be useable with potentially a larger number of data objects to assuredly match with the initial data object, and with potentially improved performance, due to the reduced number of comparisons needed.

In some exemplary embodiments, Step 330 may be performed several times, each of which may yield a different set of core attributes of the initial data object. Each different set may be utilized in Steps 340-350 independently.

On Step 340, a second data object may be obtained. The second data object may be a data object comprising the subset of attributes determined in Step 330 and having the same values for such subset as assigned in the initial data object. Due to sharing the values of the subset, and in view of the knowledge that the subset and its values are a core set of attributes, the second data object may be assuredly matched with the initial data object.

On Step 350, the initial data object may be extended based on the second data object. In some exemplary embodiments, the extension of the initial data object may be by adding to the initial data object an attribute and a value that were not previously assigned thereby. In some exemplary embodiments, the initial data object may not have any assignment for the new attribute, and the new attribute may be added together with its value as defined in the second data object. Additionally or alternatively, the initial data object may have an assignment for the new attribute, but of a different value. The extension may include adding a second alternative value based on the value of the second data object.

Data Object 510 of FIG. 5A may be the initial data object. The subset of Name 512="Robert Cross", City 513="Fort Worth" and State 514="TX (USA)" may be determined in Steps 320-330. A second data object, such as Data Object 560, may be obtained. Data Object 560 shares the values of the subset of attributes with Data Object 510. As a result, Data Object 510 may be extended on Step 350, to include additional information, such as Wife Name 564, Wife Date of Birth 565. In some cases, some additional information may not be added to the initial data object, such as Husband Date of Birth 563. The determination whether or not to add the attribute may be based on the purpose of extending the initial data object. As is shown later on, extension of a data object may be performed so as to allow assured matching with other data objects. In some cases, the attributes that are shared with the target object for matching may be added, while others may not. Additionally or alternatively, attributes that have an AUL above a minimal threshold may be added, as they may be used for assuredly matching other objects. As another example, if the purpose of extending the initial data object is to gather financial information, attributes relating to non-financial matters may not be added. As yet another example, if the purpose of extending the initial data object is to gather information about family members of the person depicted in the initial data object, only information relating to his family members may be added.

Figure SI illustrated Extended Data Object 510' which is Data Object 510 extended with Wife 564 attribute having the value of "Sylvia Cross", and Wife DoB 565 attribute having the value of "Apr. 2, 1974".

In some exemplary embodiments, the method of FIG. 3 may be repeated after the data object is extended, to determine additional subsets of attributes (330), such as subsets that comprise at least one attribute that was added on Step 350. Based on the additional subsets, additional data objects that share the values of the additional subsets (340) may be utilized to further extend the initial data object (350)

Figure 4:
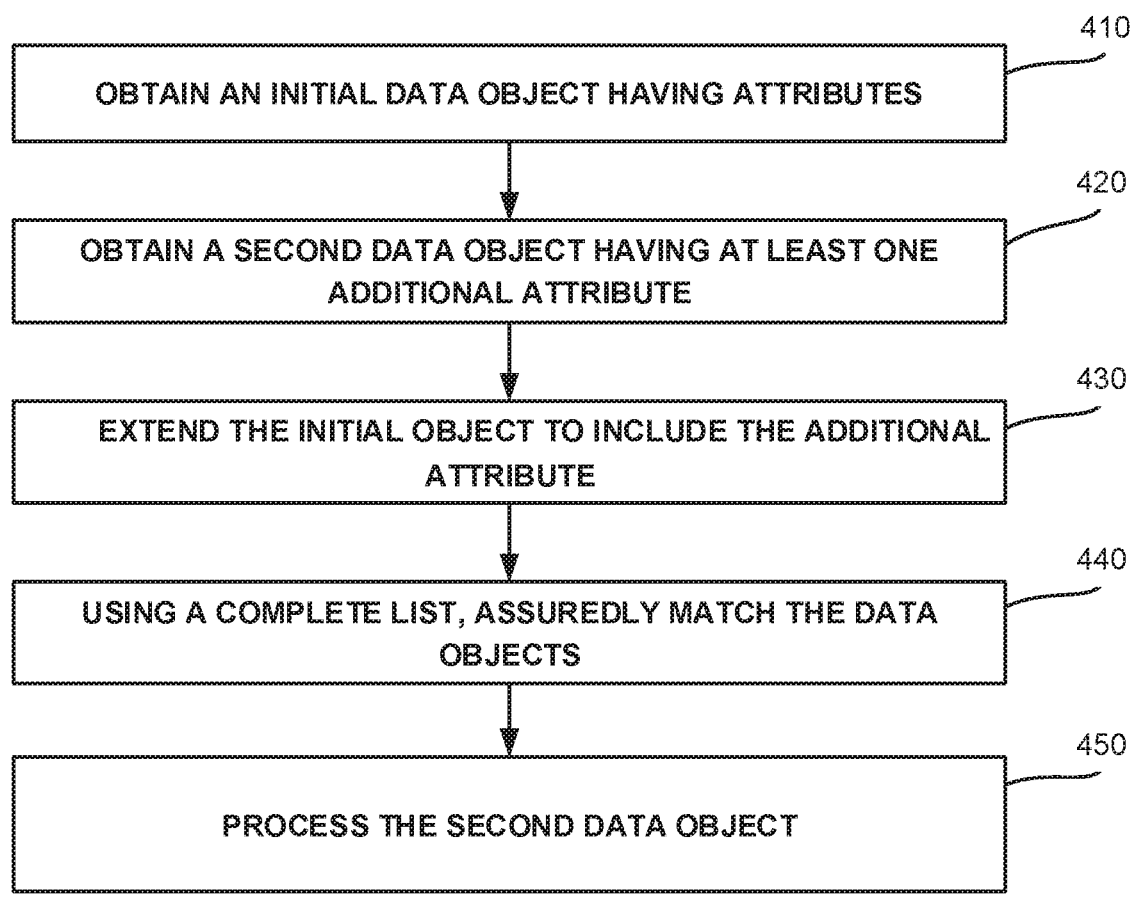
FIG. 4 shows a flowchart diagram of a method, in accordance with some exemplary embodiments of the disclosed subject matter.

Referring now to FIG. 4 showing a flowchart of a method, in accordance with some exemplary embodiments of the disclosed subject matter.

On Step 410, an initial data object, such as Data Object 510 of FIG. 5A, may be obtained. The initial data object may be obtained from similar sources such as the first data object in Step 210 of FIG. 2. Additionally or alternatively, the initial data object may be used in a processing operation similar to the processing operations discussed in Step 210 of FIG. 2.

On Step 420, a second data object may be obtained. The second data object may be obtained from similar sources such as the first data object in Step 210. In some exemplary embodiments, the second data object may comprise assignments of values to a plurality of attributes. In some cases, the second data object may comprise one or more attributes and assignments thereto that are not comprised by the initial data object.

In some exemplary embodiments, it may be desired to assuredly match the initial data object and the second data object. However, in some cases, such assuredly matching may not be performed, as the two data objects may not share values of any attribute, may share values for some attributes insufficient for assuredly matching, or the like.

As an example, the initial data object may comprise attributes such as $Att_1$, $Att_2$, $Att_3$ and may not comprise $Att_4$. The second data object may comprise $Att_4$ and may further comprise $Att_5$, $Att_6$. In this example, there is no shared attribute between the two data objects.

Referring now to FIG. 5J sowing a List 570 of children. It may be desired to assuredly match a child to the person represented by Data Object 510. As an example, consider Entry 570a representing a child named "Dylan Cross", having date of birth on Jul. 1, 2008, a parent named Sylvia Cross who has a date of birth on Apr. 2, 1974 and is indicated to be from the state of Texas (TX). As can be appreciated, although Data Object 510 comprises values to several attributes, there is a shared attribute with a shared value regarding the state being Texas. However, such attribute alone is insufficient to assuredly match the two data objects. It is also noted that Data Object 570a comprises attributes and values that do not exist in Data Object 510, such as the name of the child, the name of the parent, and so on.

On Step 430, the initial data object may be extended. The initial data object may be extended to include the at least one additional attribute. Additionally or alternatively, the initial data object may be extended using the method described in FIG. 3. In some exemplary embodiments, the extension may be aimed at adding to the initial data object one or more attributes for which the second data object has values. For example, referring to the example above, the initial data object may be extended so as to add $Att_4$, $Att_5$, or $Att_6$. Consider, for example, that using one complete list, the initial data object may be assuredly matched with an auxiliary data object, such as a data object having values for Att1, $Att_4$. Based on a shared value for $Att_1$, the initial data object and the auxiliary data object may be assuredly matched and the initial data object may be extended to also include $Att_4$. If the value of $Att_4$ is the same as that assigned in the second data object, the extension may be useful in assuredly matching the initial data object and the second data object.

As another example, using Data Object 560, Data Object 510 may be extended and Data Object 510' may be obtained.

On Step 440, using a complete list, the extended data object may be assuredly matched with the second data object. The assured matching may be performed by obtaining a complete list that is complete with respect to shared values of shared attributes of the extended data object and the second data object. Referring again to the example above, the complete list may be complete with respect to the shared value of $Att_4$. Assuredly matching may be performed if the complete list comprises a single entry. It is noted that the complete list used on Step 440 may be the same complete list or a different complete list than that used for extending the initial data object. As can be appreciated, although the initial data object and the second data object may not share sufficient amount of data to enable assuredly matching (and potentially may not share any data at all), assuredly matching is enabled through the use of auxiliary data objects that are used to extend the initial data object and add data thereto. In some cases, more than a single auxiliary data object may be used, and Step 430 may be performed repeatedly until a complete list that can be used to assuredly match the extended data object and the second data object is available.

As another concrete example, Complete List 580 of FIG. 5K may be utilized to assuredly match Data Object 510' with Entry 570a. Complete List 580 may be a complete list of all people named Sylvia Cross from Texas. Complete List 50 may comprise a single entry, Entry 580a, that matches the filter Name="Sylvia Cross" and "Year of Birth=1974". Hence, the complete list of all the people named Sylvia Cross from Texas who were born on 1974 comprises a single unique entry, Entry 570a. Thus, Entry 570a may be assuredly matched to Data Object 510' as they both refer to Sylvia Cross whose date of birth is in the year 1974.

On Step 450, the second data object may be processed. In some cases, the second data object may be processed together with the processing of the initial data object, so as to enrich the information available regarding the entity represented by the two objects.

Figure 6A:
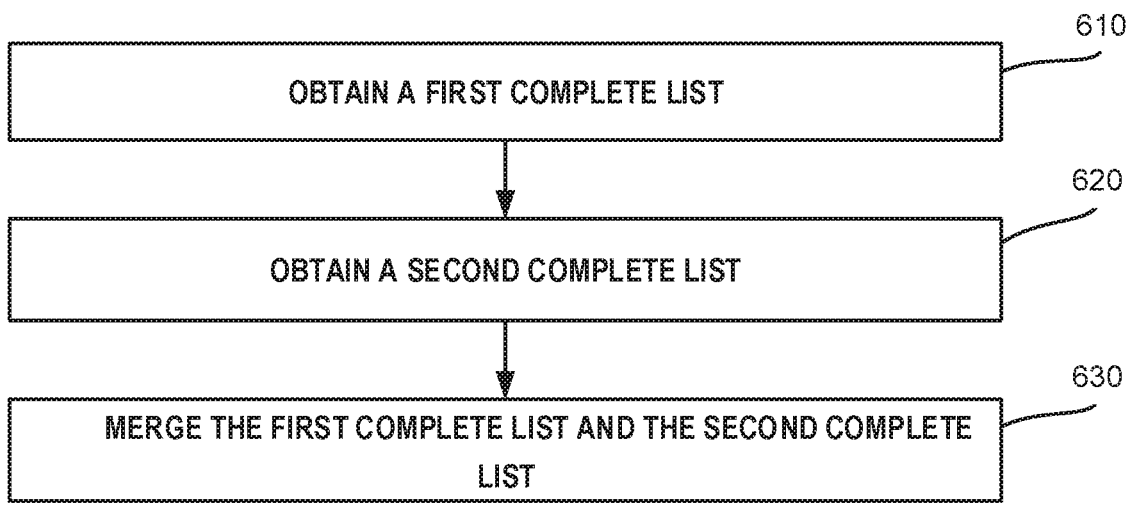
FIGS. 6A-6C show flowchart diagrams of methods, in accordance with some exemplary embodiments of the disclosed subject matter.

Referring now to FIG. 6A showing a flowchart of a method, in accordance with some exemplary embodiments of the disclosed subject matter.

On Step 610, a first complete list may be obtained. The first complete list may comprise at least one data object of a shared type. Each object of the first complete list may have assigned values for attributes. The first complete list may be complete with respect to at least one attribute and with respect to assignment of corresponding values thereto. For example, the first complete list may be complete with respect to $Att_1=v_1^1$, $Att_2=v_2^1$, ..., $Att_n=c_n^1$.

On Step 620, a second complete list may be obtained. The second complete list may comprise at least one data object of the shared type. Each object of the second complete list may have assigned values for attributes. It is noted that the attributes of the objects of the second complete list may be the same or different than those of the objects of the first complete list. It is further noted that data objects in the same list may be associated with different attributes. For example, a one data object representing a person may have a value for eye color but not for height, whereas another data object in the same list representing another person may have a value for height but not for eye color.

The second complete list may be complete with respect to at least one attribute and with respect to assignment of corresponding values thereto. For example, the second complete list may be complete with respect to $Att_1=v_1^2$, $Att_2=v_2^2$, ..., $Att_n=v_n^2$.

In some exemplary embodiments, the first and second complete lists may assign the same value for a subset of the at least one attribute, and different values for the remaining attributes. For example, and without loss of generality, $v_2^1=v_2^2$, ..., $v_n^1=v_n^2$ and on the remaining attributes ($Att_1$) may be assigned different values, i.e., $v_1^1 \neq v_1^2$. Consider the following concrete example: a first complete list of employees of the Apple Inc. company that work in the HR department. A second complete list may be of employees of the Apple Inc. company that work in the R&D department. As can be appreciated, there is one attribute for which the value is shared (company) and one attribute for which the value is different (department).

On Step 630, the first complete list and the second complete list may be merged. In case a same object exists in both lists, the merged list may comprise a single copy thereof. The merged list, comprising the data objects of the first complete list and of the second complete list, is also a complete list. The merged list may be a merged list with respect to at least one attribute and with respect to assignment of corresponding values thereto as defined by the first and the second list. Referring to the general example above, the merged list may be a complete list with respect to $Att_1=v_1^1$ OR $v_1^2$, $Att_2=v_2^1$, ..., $Att_n=v_n^1$. If the only possible values to $Att_1$ are $v_1^1$ or $v_1^2$, then the merged list may be a complete list with respect to $Att_2=v_2^1$, ..., $Att_n=v_n^1$ Referring to the concrete example above, the merged list may be a complete list of all employees of Apple Inc. that work in either the R&D or HR departments. If Apple Inc. only has these two departments, the merged list may be a complete list of all Apple Inc. employees, and may thus be Complete List 550 of FIG. 5F.

In some exemplary embodiments, additional merging may be performed by obtaining additional complete lists with data objects of the shared type. For example, additional complete lists of additional departments of Apple Inc. may be obtained and merged until a complete list of all Apple Inc. employees is formed.

In some exemplary embodiments, a complete list with respect to shared attributes whose values are shared between two data objects may be formed for the purpose of assuredly matching the two data objects. The first and second complete lists may be complete lists with respect to the one or more shared attributes and an auxiliary attribute. The value of the auxiliary attribute may not necessarily be shared by the two data objects that are potentially matched. Additionally or alternatively, the two data objects may not have any assignment to the auxiliary variable. Referring again to the concrete example above, the auxiliary attribute may be the department of the employee where neither Data Object 510 nor Data Object 520 assign a value for such attribute. The one or more shared attributes in this case may be the employee being employed by Apple Inc. (Employer 515 and Employer 535). By gathering complete lists of each department and merging them together, a complete list of all Apple Inc. employees may be formed and utilized.

Figure 6B:
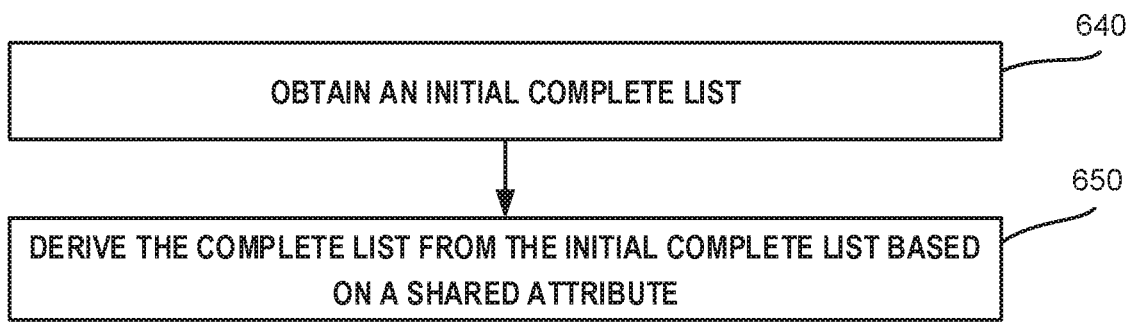

Referring now to FIG. 6B showing a flowchart of a method, in accordance with some exemplary embodiments of the disclosed subject matter.

On Step 640, an initial complete list is obtained. The initial complete list may comprise one or more data objects of a shared type. The initial complete list may be a complete list with respect to a first attribute. Each data object in the initial complete list may be associated with the same value for the first attribute. The initial complete list may comprise all data objects for which the first attribute is assigned with a predetermined value.

In some exemplary embodiments, a second attribute may be a complete attribute in the initial complete list. Each data object in the initial complete list may have an assigned value for the second attribute. In some exemplary embodiments, the initial complete list may or may not comprise data objects for which the second attribute has different values.

Referring now to Complete List 590 of FIG. 5L illustrating an initial complete list of all contacts of a company (not shown). In the illustrated example, there are four contacts for the company. City 591 is a complete attribute in Complete List 590, as each entry in Complete List 590 assigns at least one value for City 591. Note that Entry 590a assigns two values for City 591—New York and Amsterdam. Phone 592, on the other hand, is not a complete attribute in Complete List 590 as there exists one entry, Entry 590b, in which Phone 592 is not assigned any value. It is noted that a filter that is based on the value of Phone 592 cannot be guaranteed to yield a complete list. The phone information of Entry 590b is unknown and as a result it may not be known whether to include or exclude Entry 590b from any derived list that is based on the value of Phone 592. It is noted, however, that if Entry 590b indicates that the value of Phone 592 is known to be "does not exist", Phone 592 may be considered a complete attribute.

On Step 650, a second complete list may be derived from the initial complete list. The second complete list may be derived by selecting a subset of the data objects in the initial complete list. The subset may be selected based on a value of the second attribute. For example, the second complete list may comprise all data objects from the initial complete list for which the second data attribute has a predetermined value.

Complete List 590' may be derived from Complete List 590, such as based on the filter "City=New York". Complete List 590' may comprise all contacts of the company whose address is in New York. Entry 590a and Entry 590c may represent such contacts, and may be included in Complete List 590', whereas the remaining contacts of Complete List 50 may be excluded from the derived list, Complete List 590'. It is noted that Entry 590a' may include only the city information relevant to the filter, i.e., New York, and may exclude the city information that is not relevant to the filter, i.e., Amsterdam, which is mentioned in Entry 590a.

In some exemplary embodiments, the initial complete list may be a complete list with respect to a first shared attribute whose value is shared between two candidate data objects for matching. However, in case the initial complete list has more than a single entry, the two candidates may not be assuredly matched based on the initial complete list alone. A second shared attribute, whose value is shared between the two candidates, may be selected and the derivation of the complete list may be performed based thereof. As a result, a complete list having potentially fewer entries may be obtained and used for assuredly matching the two candidate data objects. In some exemplary embodiments, additional derivation may be performed until a complete list having a single entry is obtained.

For example, referring again to FIG. 5D showing Complete List 540. Complete List 540 may be an initial complete list that is complete with respect to the shared attributes of city="Fort Worth" and State="TX (USA)". In matching Data Object 510 of FIG. 5A with Data Object 520 of FIG. 5B, Complete List 540 is not in itself sufficient to assuredly match the two candidate objects. However, Data Objects 510, 520 also share the value of the "Name" attribute (512, 522). Complete List 540 may be used to derive Complete List 540' which includes only the entries of Complete List 540 for which the value of the name attribute (541) is the shared value comprised by both Data Objects 510, 520 (i.e. "Robert Cross"). Hence, a second complete list is derived from the initial complete list. As the derived complete list comprises a single entry, Data Objects 510, 520 may be assuredly matched based thereon.

Figure 6C:
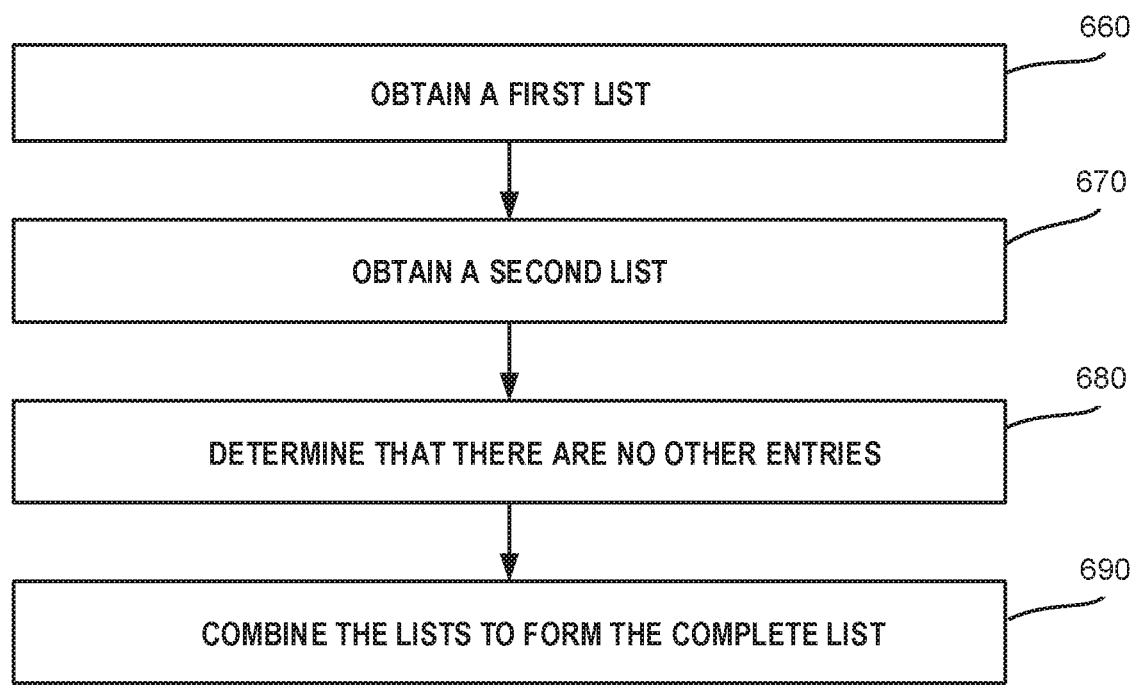

Referring now to FIG. 6C showing a flowchart of a method, in accordance with some exemplary embodiments of the disclosed subject matter.

On Steps 660 and 670, a first list and a second list may be obtained. The first and second lists may comprise data objects of a same type having a shared property. The first and second lists may not be a complete list. The data objects in the lists may assign values to attributes, and in particular to one shared attribute representing the shared property. It may be desired to create a complete list of all entries having the shared property.

On Step 680, it may be determined that there are no other data objects of the same type sharing the shared property in addition to the entries in the first and second lists. Additionally or alternatively, in case there are additional such entries or lists retaining such entries, those may be collected and treated together with the first and second lists. In some exemplary embodiments, the determination may be based on a rate of obtaining new entries and determining that there are no additional entries that were found in a timeframe in which an additional entry may be found. In some exemplary embodiments, entropy measurements, joint entropy measurement, or the like, may be used to estimate whether or not there are additional entries.

On Step 690, the lists may be combined to form a complete list. The complete list is a complete list with respect to the shared property. Additionally or alternatively, the complete list may be derived from non-complete lists.

As an example, a complete list of all courts in the USA may be created. The Internet may be searched for legal opinions and from each opinion an identification of the court may be obtained. After all courts are already added, no new courts may be discovered for a long time. For example, if a new court was found every 100 decisions, after all the courts have been identified, a new court is not found even after reviewing additional 10,000 decisions. It may be estimated that there are no additional courts, and the complete list of the courts may be formed.

As another example, the list of all federal courts may be obtained from one source, whereas state courts may be obtained from a second source. After obtaining fifty lists of courts of the different states, it may be determined that no additional courts can be found, and a complete list may be formed based on the lists of federal and state courts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing a processing operation with respect to a first data object, the first data object comprises a first set of attributes and values thereof, the method comprising:
    obtaining a second data object, wherein the second data object comprises a second set of attributes and values thereof, wherein the first set of attributes is different than the second set of attributes;
    identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute;
    obtaining a complete list with respect to the at least one shared attribute, wherein the complete list comprises all data objects of a shared type, wherein each of the all data objects of the shared type comprise a value for each of the at least one shared attribute;
    in response to determining that a number of entries in the complete list that comprise the corresponding shared value for each of the at least one shared attribute is exactly one, processing the second data object as part of the processing operation of the first data object; and
    avoiding processing in the processing operation a third data object having one or more attributes and values that are shared with the first data object;
    whereby reducing an overall processing time and an overall storage required for performing the processing operation.

2. The method of claim 1, further comprises obtaining the first data object, wherein said obtaining the first data object comprises:
    obtaining an initial data object, wherein the initial data object excludes at least a portion of the at least one shared attribute; and
    extending the initial object to include the at least the portion of the at least one shared attribute based on a fourth data object.

3. The method of claim 2, wherein said extending the initial object comprises:
    determining a subset of the first set of attributes yielding a second complete list of size one, wherein the second complete list comprises the subset of the first set of attributes and values thereof; and
    obtaining the fourth data object, wherein the fourth data object comprises the subset of the first set of attributes and values thereof and the at least the portion of the at least one shared attribute.

4. The method of claim 2, wherein the at least the portion of the at least one shared attribute comprises a first attribute and a second attribute, wherein said extending comprises adding to the initial object the first attribute based on the fourth data object and adding to the initial object the second attribute based on a fifth object.

5. The method of claim 1, wherein said obtaining the complete list comprises:
    obtaining a first complete list and a second complete list, wherein the first complete list and the second complete list comprise data objects of the shared type, wherein the first complete list is a complete list with respect to the at least one shared attribute and an auxiliary attribute being assigned a first value, wherein the second complete list is a complete list with respect to the at least one shared attribute and the auxiliary attribute being assigned a second value; and
    merging the first complete list and the second complete list to obtain the complete list.

6. The method of claim 1, wherein the at least one shared attribute comprises a first shared attribute and a second shared attribute, wherein said obtaining the complete list comprises:
    obtaining an initial complete list with respect to the first shared attribute, wherein the initial complete list comprises data objects of the shared type,
    wherein each entry in the initial complete list has a value corresponding the second shared attribute; and
    deriving the complete list from the initial complete list by selecting a subset of the entries for which the second shared attribute comprises the corresponding shared value thereof.

7. The method of claim 1, wherein said obtaining the complete list comprises:
    obtaining a first list and a second list, wherein each of the first and second lists comprise data objects of the shared type having a value for each of the at least one shared attribute; and in response to determining that there are no other lists that comprise data objects of the shared type, combining the first list and the second list to form the complete list.

8. A computerized apparatus having a processor and coupled memory, the processor being adapted to perform a method for performing a processing operation with respect to a first data object, the first data object comprises a first set of attributes and values thereof, the method comprising:
obtaining a second data object, wherein the second data object comprises a second set of attributes and values thereof, wherein the first set of attributes is different than the second set of attributes;
identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute;
obtaining a complete list with respect to the at least one shared attribute, wherein the complete list comprises all data objects of a shared type, wherein each of the all data objects of the shared type comprise a value for each of the at least one shared attribute;
in response to determining that a number of entries in the complete list that comprise the corresponding shared value for each of the at least one shared attribute is exactly one, processing the second data object as part of the processing operation of the first data object; and
avoiding processing in the processing operation a third data object having one or more attributes and values that are shared with the first data object;
whereby reducing an overall processing time and an overall storage required for performing the processing operation.

9. The computerized apparatus of claim 8, wherein said processor is further adapted to obtain the first data object, wherein said obtaining the first data object comprises:
obtaining an initial data object, wherein the initial data object excludes at least a portion of the at least one shared attribute; and
extending the initial object to include the at least the portion of the at least one shared attribute based on a fourth data object.

10. The computerized apparatus of claim 9, wherein said extending the initial object comprises:
determining a subset of the first set of attributes yielding a second complete list of size one, wherein the second complete list comprises the subset of the first set of attributes and values thereof; and
obtaining the fourth data object, wherein the fourth data object comprises the subset of the first set of attributes and values thereof and the at least the portion of the at least one shared attribute.

11. The computerized apparatus of claim 9, wherein the at least the portion of the at least one shared attribute comprises a first attribute and a second attribute, wherein said extending comprises adding to the initial object the first attribute based on the fourth data object and adding to the initial object the second attribute based on a fifth object.

12. The computerized apparatus of claim 8, wherein said obtaining the complete list comprises:
obtaining a first complete list and a second complete list, wherein the first complete list and the second complete list comprise data objects of the shared type, wherein the first complete list is a complete list with respect to the at least one shared attribute and an auxiliary attribute being assigned a first value, wherein the second complete list is a complete list with respect to the at least one shared attribute and the auxiliary attribute being assigned a second value; and
merging the first complete list and the second complete list to obtain the complete list.

13. The computerized apparatus of claim 8, wherein the at least one shared attribute comprises a first shared attribute and a second shared attribute, wherein said obtaining the complete list comprises:
obtaining an initial complete list with respect to the first shared attribute, wherein the initial complete list comprises data objects of the shared type,
wherein each entry in the initial complete list has a value corresponding the second shared attribute; and
deriving the complete list from the initial complete list by selecting a subset of the entries for which the second shared attribute comprises the corresponding shared value thereof.

14. The computerized apparatus of claim 8, wherein said obtaining the complete list comprises:
obtaining a first list and a second list, wherein each of the first and second lists comprise data objects of the shared type having a value for each of the at least one shared attribute; and
in response to determining that there are no other lists that comprise data objects of the shared type, combining the first list and the second list to form the complete list;
avoiding processing in the processing operation a third data object having one or more attributes and values that are shared with the first data object;
whereby reducing an overall processing time and an overall storage required for performing the processing operation.

15. A computer program product comprising a non-transitory computer readable medium retaining program instructions, which program instructions when read by a processor, cause the processor to perform a method comprising:
having a first data object, wherein the first data object comprises a first set of attributes and values thereof;
obtaining a second data object, wherein the second data object comprises a second set of attributes and values thereof, wherein the first set of attributes is different than the second set of attributes;
identifying at least one shared attribute, each of which having a corresponding shared value, wherein each of the at least one shared attribute is comprised by the first set of attributes and by the second set of attributes, wherein the first data object and the second data object comprise the corresponding shared value for each of the at least one shared attribute;
obtaining a complete list with respect to the at least one shared attribute, wherein the complete list comprises all data objects of a shared type, wherein each of the all data objects of the shared type comprise a value for each of the at least one shared attribute;
in response to determining that a number of entries in the complete list that comprise the corresponding shared value for each of the at least one shared attribute is exactly one, processing the second data object as part of a processing operation of the first data object; and
avoiding processing in the processing operation a third data object having one or more attributes and values that are shared with the first data object;

whereby reducing an overall processing time and an overall storage required for performing the processing operation.

16. The computer program product of claim 15, wherein said having comprises obtaining the first data object, wherein said obtaining the first data object comprises:
   obtaining an initial data object, wherein the initial data object excludes at least a portion of the at least one shared attribute; and
   extending the initial object to include the at least the portion of the at least one shared attribute based on a fourth data object.

17. The computer program product of claim 16, wherein the at least the portion of the at least one shared attribute comprises a first attribute and a second attribute, wherein said extending comprises adding to the initial object the first attribute based on the fourth data object and adding to the initial object the second attribute based on a fifth object.

18. The computer program product of claim 15, wherein said obtaining the complete list comprises:
   obtaining a first complete list and a second complete list, wherein the first complete list and the second complete list comprise data objects of the shared type, wherein the first complete list is a complete list with respect to the at least one shared attribute and an auxiliary attribute being assigned a first value, wherein the second complete list is a complete list with respect to the at least one shared attribute and the auxiliary attribute being assigned a second value; and
   merging the first complete list and the second complete list to obtain the complete list.

19. The computer program product of claim 15, wherein the at least one shared attribute comprises a first shared attribute and a second shared attribute, wherein said obtaining the complete list comprises:
   obtaining an initial complete list with respect to the first shared attribute, wherein the initial complete list comprises data objects of the shared type,
   wherein each entry in the initial complete list has a value corresponding the second shared attribute; and
   deriving the complete list from the initial complete list by selecting a subset of the entries for which the second shared attribute comprises the corresponding shared value thereof.

20. The computer program product of claim 15, wherein said obtaining the complete list comprises:
   obtaining a first list and a second list, wherein each of the first and second lists comprise data objects of the shared type having a value for each of the at least one shared attribute; and
   in response to determining that there are no other lists that comprise data objects of the shared type, combining the first list and the second list to form the complete list.

* * * * *